United States Patent
Todokoro

(10) Patent No.: US 9,621,756 B2
(45) Date of Patent: Apr. 11, 2017

(54) OPTICAL SCANNING DEVICE, IMAGE FORMING APPARATUS INCLUDING OPTICAL SCANNING DEVICE, AND POSITION ADJUSTMENT METHOD OF SYNCHRONIZATION DETECTION SENSOR MOUNTED IN OPTICAL SCANNING DEVICE

(71) Applicant: KYOCERA Document Solutions Inc., Osaka (JP)

(72) Inventor: Ryotaro Todokoro, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/052,128

(22) Filed: Feb. 24, 2016

(65) Prior Publication Data
US 2016/0248931 A1   Aug. 25, 2016

(30) Foreign Application Priority Data
Feb. 25, 2015 (JP) ................. 2015-035564

(51) Int. Cl.
*H04N 1/04* (2006.01)
*H04N 1/024* (2006.01)
(Continued)

(52) U.S. Cl.
CPC ....... *H04N 1/02481* (2013.01); *G02B 26/127* (2013.01); *H04N 1/0249* (2013.01);
(Continued)

(58) Field of Classification Search
CPC ....... H04N 1/1135; H04N 2201/02493; H04N 2201/04744; H04N 2201/04755;
(Continued)

(56) References Cited

U.S. PATENT DOCUMENTS 5,701,191 A * 12/1997 Iwasaki ................. G02B 26/12
359/205.1
2003/0128270 A1* 7/2003 Kato .................... G02B 26/123
347/233
(Continued)

FOREIGN PATENT DOCUMENTS

| JP | 08-184773 | 7/1996 |
| JP | 2000-255096 | 9/2000 |
| JP | 2007-034015 | 2/2007 |

*Primary Examiner* — Negussie Worku
(74) *Attorney, Agent, or Firm* — Wenderoth, Lind & Ponack, L.L.P.

(57) ABSTRACT

An optical scanning device includes a light source that emits light, a deflector that deflects and scans the light emitted from the light source in a main scanning direction, a housing, a synchronization detection sensor, and a sensor board. The synchronization detection sensor is mounted in the housing, detects scanning light from the deflector, and outputs a write timing reference signal of image data. The sensor board is mounted with the synchronization detection sensor. The aforementioned sensor board is formed with a light transmitting hole for allowing a part of the scanning light to pass therethrough when an incident position of the scanning light for a light receiving surface coincides with a center position of the aforementioned light receiving surface in a sub-scanning direction on an extension line of a center line of the light receiving surface of the aforementioned synchronization detection sensor in the sub-scanning direction.

8 Claims, 6 Drawing Sheets

Left side ◄── Right and left direction of image forming apparatus ──► Right side

(51) Int. Cl.
*H04N 1/047* (2006.01)
*H04N 1/06* (2006.01)
*G02B 26/12* (2006.01)

(52) U.S. Cl.
CPC ............ *H04N 1/0473* (2013.01); *H04N 1/06* (2013.01); *H04N 2201/0094* (2013.01)

(58) Field of Classification Search
CPC ............... H04N 1/0473; H04N 1/126; H04N 2201/02414; H04N 2201/02441; H04N 2201/04762
USPC ....... 358/474, 1.15, 1.7, 401, 447, 473, 509, 358/511; 399/151, 177, 218, 220, 221, 49
See application file for complete search history.

(56) References Cited

U.S. PATENT DOCUMENTS

| | | | | |
|---|---|---|---|---|
| 2006/0243886 | A1* | 11/2006 | Nomura | G02B 26/105 250/208.1 |
| 2008/0055682 | A1* | 3/2008 | Minamino | H04N 1/46 358/520 |
| 2008/0223924 | A1* | 9/2008 | Riahi | H05B 37/0227 235/380 |
| 2010/0119258 | A1* | 5/2010 | Teramura | G02B 26/123 399/151 |
| 2011/0169906 | A1* | 7/2011 | Suzuki | B41J 2/473 347/224 |
| 2013/0258033 | A1* | 10/2013 | Ryotaro | G02B 26/10 347/224 |
| 2014/0354756 | A1* | 12/2014 | Yoshida | B41J 2/47 347/250 |

* cited by examiner

Right and left direction of image forming apparatus
Left side ← → Right side

Main scanning direction

OPTICAL SCANNING DEVICE, IMAGE FORMING APPARATUS INCLUDING OPTICAL SCANNING DEVICE, AND POSITION ADJUSTMENT METHOD OF SYNCHRONIZATION DETECTION SENSOR MOUNTED IN OPTICAL SCANNING DEVICE

CROSS-REFERENCE TO RELATED APPLICATION

This application is based upon and claims the benefit of priority from Japanese Patent Application No. 2015-035564 filed on Feb. 25, 2015, the entire contents of which are incorporated herein by reference.

BACKGROUND

The technology of the present disclosure relates to an optical scanning device, an image forming apparatus including the optical scanning device, and a position adjustment method of a synchronization detection sensor mounted in the optical scanning device.

Conventionally, there has been known an optical scanning device mounted in an electrophotographic image forming apparatus. The optical scanning device is configured to emit light corresponding to image data at a predetermined write timing, thereby exposing a photosensitive drum. The optical scanning device has a light source, a deflector that deflects light emitted from the light source and converts the light into scanning light, an image forming lens that forms an image of the scanning light from the deflector on the photosensitive drum, and a synchronization detection sensor that detects a part of the scanning light as a write timing reference signal of the aforementioned image data. In this type of optical scanning device, there is a case in which an incident position of the scanning light for the synchronization detection sensor is deviated in a sub-scanning direction with respect to a design position due to thermal deformation at the time of an operation of the deflector or assembling errors of a reflective mirror. As a consequence, there occurs a problem that it is not possible to detect the scanning light by the synchronization detection sensor, and the like.

In order to prevent this problem, there has been proposed to perform position adjustment of the synchronization detection sensor such that the scanning light is incident into a center position of a light receiving surface of the synchronization detection sensor in the sub-scanning direction. In this adjustment method, a slit plate having a slit hole extending in the sub-scanning direction is used. At a center part of the slit hole in the sub-scanning direction, a width wide part enlarged in a main scanning direction is formed. The slip plate has been assembled and fixed to a front side of the synchronization detection sensor. The assembling is performed such that a center position (a position of the width wide part) of the slit hole, which has been formed in the slit plate, in the sub-scanning direction coincides with a center position of the synchronization detection sensor in the sub-scanning direction. In the position adjustment of the synchronization detection sensor, the synchronization detection sensor is moved vertically together with the aforementioned slit plate while sensing an output signal from the synchronization detection sensor by using a measuring equipment such as an oscilloscope. Then, in a position in which an output time of the output signal from the synchronization detection sensor is longest, the synchronization detection sensor is fixed by screws and the like.

SUMMARY

An optical scanning device according to one aspect of the present disclosure includes a light source, a deflector, a housing, a synchronization detection sensor, and a sensor board. The light source emits light. The deflector deflects the light emitted from the light source and allows the deflected light to be scanned in a main scanning direction. The housing accommodates the deflector. The synchronization detection sensor is mounted in the housing, detects scanning light from the deflector, and outputs a write timing reference signal of image data. The sensor board is mounted with the synchronization detection sensor.

The aforementioned sensor board is formed with a light transmitting hole for allowing a part of the scanning light to pass therethrough when an incident position of the scanning light for a light receiving surface coincides with a center position of the aforementioned light receiving surface in a sub-scanning direction on an extension line of a center line of the light receiving surface of the aforementioned synchronization detection sensor in the sub-scanning direction.

According to the technology of the present disclosure, it is possible to allow an incident position of scanning light for a light receiving surface of a synchronization detection sensor to highly accurately coincide with a center position of the light receiving surface in a sub-scanning direction.

DETAILED DESCRIPTION

Hereinafter, an example of an embodiment will be described in detail on the basis of the drawings. It is noted that the technology of the present disclosure is not limited to the following embodiments.

Embodiment

Figure 1:
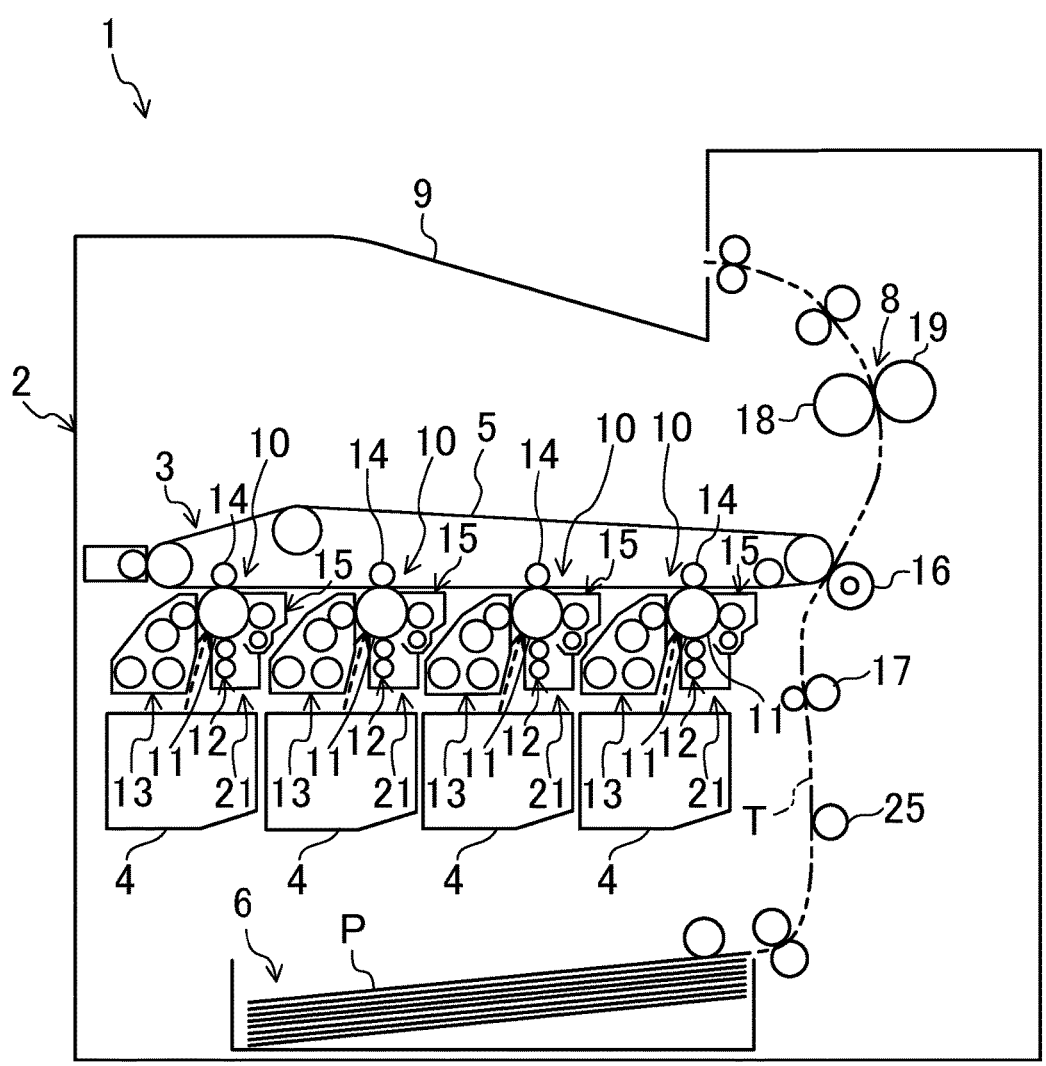
FIG. 1 is a schematic diagram illustrating an internal structure of an image forming apparatus in an example of an embodiment.

FIG. 1 illustrates a schematic configuration diagram illustrating an image forming apparatus 1 in the present embodiment. In the following description, it is assumed that a front side and a rear side indicate a front side and a rear side (a front side and a back side in a direction vertical to the paper surface of FIG. 1) of the image forming apparatus 1, and a left side and a right side indicate a left side and a right side when the image forming apparatus 1 is viewed from the front side.

The aforementioned image forming apparatus 1 is a tandem type color printer and includes an image forming unit 3 in a box-like casing 2. The image forming unit 3 transfers an image to a paper P and forms the image on the paper P on the basis of image data transmitted from an external device such as a computer subjected to network connection and the like. Below the image forming unit 3, four optical scanning devices 4 are arranged to irradiate laser light, and above the image forming unit 3, a transfer belt 5 is arranged. Below the optical scanning devices 4, a paper feeding unit 6 is arranged to store the paper P. Above the right side of the transfer belt 5, a fixing unit 8 is arranged to perform a fixing process on the image transferred to and formed on the paper P. At an upper portion of the casing 2, a paper discharge unit 9 is formed to discharge the paper P subjected to the fixing process in the fixing unit 8. In the image forming apparatus 1, a paper conveyance path T extending toward the paper discharge unit 9 from the paper feeding unit 6 is provided.

The aforementioned image forming unit 3 includes four image forming units 10 arranged in a row along the transfer belt 5. The aforementioned four optical scanning devices 4 are respectively arranged below the image forming units 10. Each image forming unit 10 has a photosensitive drum 11. Directly under each photosensitive drum 11, a charging device 12 is arranged, and at the left side of each photosensitive drum 11, a developing device 13 is arranged. Directly above each photosensitive drum 11, a primary transfer roller 14 is arranged, and at the right side of each photosensitive drum 11, a cleaning unit 15 is arranged to clean the peripheral surface of the photosensitive drum 11.

The peripheral surface of each photosensitive drum 11 is uniformly electrified by the charging device 12, and laser light corresponding to each color based on the image data inputted from the aforementioned computer and the like is irradiated from the optical scanning device 4 to the electrified peripheral surface of the photosensitive drum 11. As a consequence, an electrostatic latent image is formed on the peripheral surface of each photosensitive drum 11. A developer is supplied to the electrostatic latent images from the developing device 13, so that a toner image of yellow, magenta, cyan, or black is formed on the peripheral surface of each photosensitive drum 11. These toner images are respectively superposed on and transferred to the transfer belt 5 by a transfer bias applied to the primary transfer roller 14.

At the right side of the transfer belt 5, a secondary transfer roller 16 is arranged. The secondary transfer roller 16 is arranged in a state of abutting the transfer belt 5. The secondary transfer roller 16 interposes the paper P conveyed along the paper conveyance path T from the paper feeding unit 6 between the secondary transfer roller 16 and the transfer belt 5. A transfer bias is applied to the secondary transfer roller 16, and the toner images on the transfer belt 5 are transferred to the paper P by the applied transfer bias.

The fixing unit 8 includes a heating roller 18 and a pressure roller 19, and presses and heats the paper P while interposing the paper P by these heating roller 18 and pressure roller 19. Accordingly, the fixing unit 8 fixes the toner images, which have been transferred to the paper P, to the paper P. The paper P subjected to the fixing process is discharged to the paper discharge unit 9.

Figure 2:
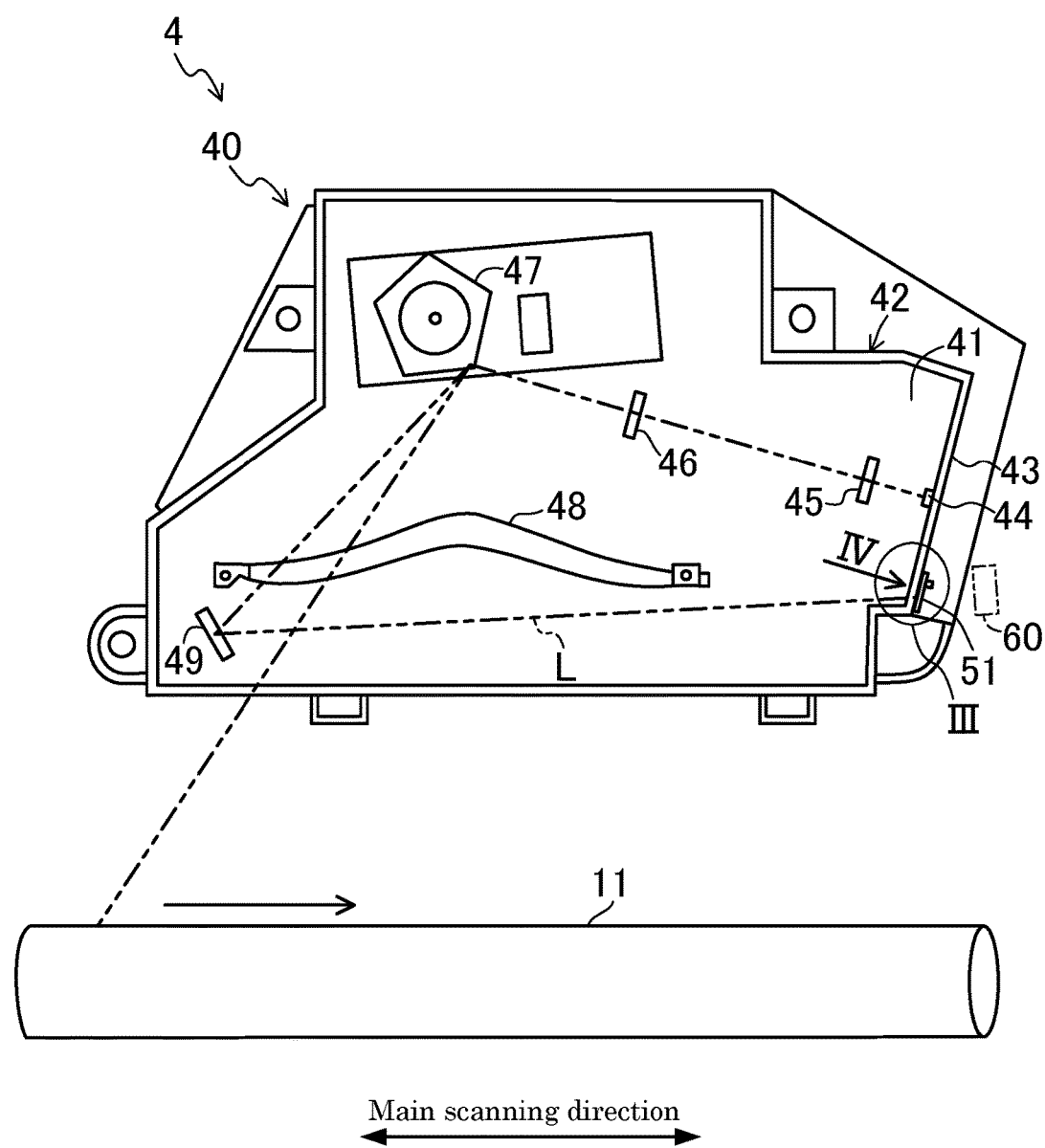
FIG. 2 is a perspective view illustrating an internal structure of an optical scanning device in an example of an embodiment.

Next, with reference to FIG. 2, each optical scanning device 4 will be described in detail. Since the optical scanning devices 4 have the same configuration, only one of them will be described and a description of the other optical scanning devices 4 will be omitted.

The optical scanning device 4 has a sealed housing 40. The housing 40 has a bottom wall part 41, an annular side wall part 42 upright along the sub-scanning direction (a direction perpendicular to a main scanning direction and a direction vertical to the paper surface of FIG. 2) from the bottom wall part 41, and a lid (not illustrated). The annular side wall part 42 of the housing 40 has a side wall part 43 having a flat plate shape. The side wall part 43, for example, is mounted with a light source 44 including a laser diode (LD) and the like. Inside the housing 40, a collimator lens 45, a cylindrical lens 46, and a polygon mirror 47 serving as a deflector are arranged on a straight line along an emission direction of light emitted from the light source 44. The polygon mirror 47 is a polygonal mirror provided on a peripheral surface thereof with a plurality of reflective surfaces, and reflects (deflects) the light emitted from the light source 44, thereby allowing the light to be scanned on the peripheral surface of the photosensitive drum 11 in the main scanning direction. Inside the housing 40, a fθ lens 48 is arranged on an optical path of the light deflected by the polygon mirror 47.

Furthermore, in the housing 40, a synchronization detection mirror 49, a synchronization detection sensor (see FIG. 3) 50, and a sensor board 51 mounted with the synchronization detection sensor 50 are provided.

Furthermore, the synchronization detection mirror 49 reflects scanning light, which travels an optical path deviated from an effective scanning range (a range in which image data is actually written) after being deflected by the polygon mirror 47, thereby allowing the reflected scanning light to be incident into the synchronization detection sensor 50. On the other hand, light, which travels an optical path in the effective scanning range after being deflected by the polygon mirror 47, scans and exposes the peripheral surface of the photosensitive drum 11 in an axial direction (the main scanning direction).

The synchronization detection sensor 50 detects scanning light L from the synchronization detection mirror 49, and outputs a reference signal of a write timing (a write timing of light to the photosensitive drum 11) of an image at the time of the detection. The synchronization detection sensor 50, for example, is configured by a photodiode, a phototransistor, a photo IC and the like.

Figure 3:
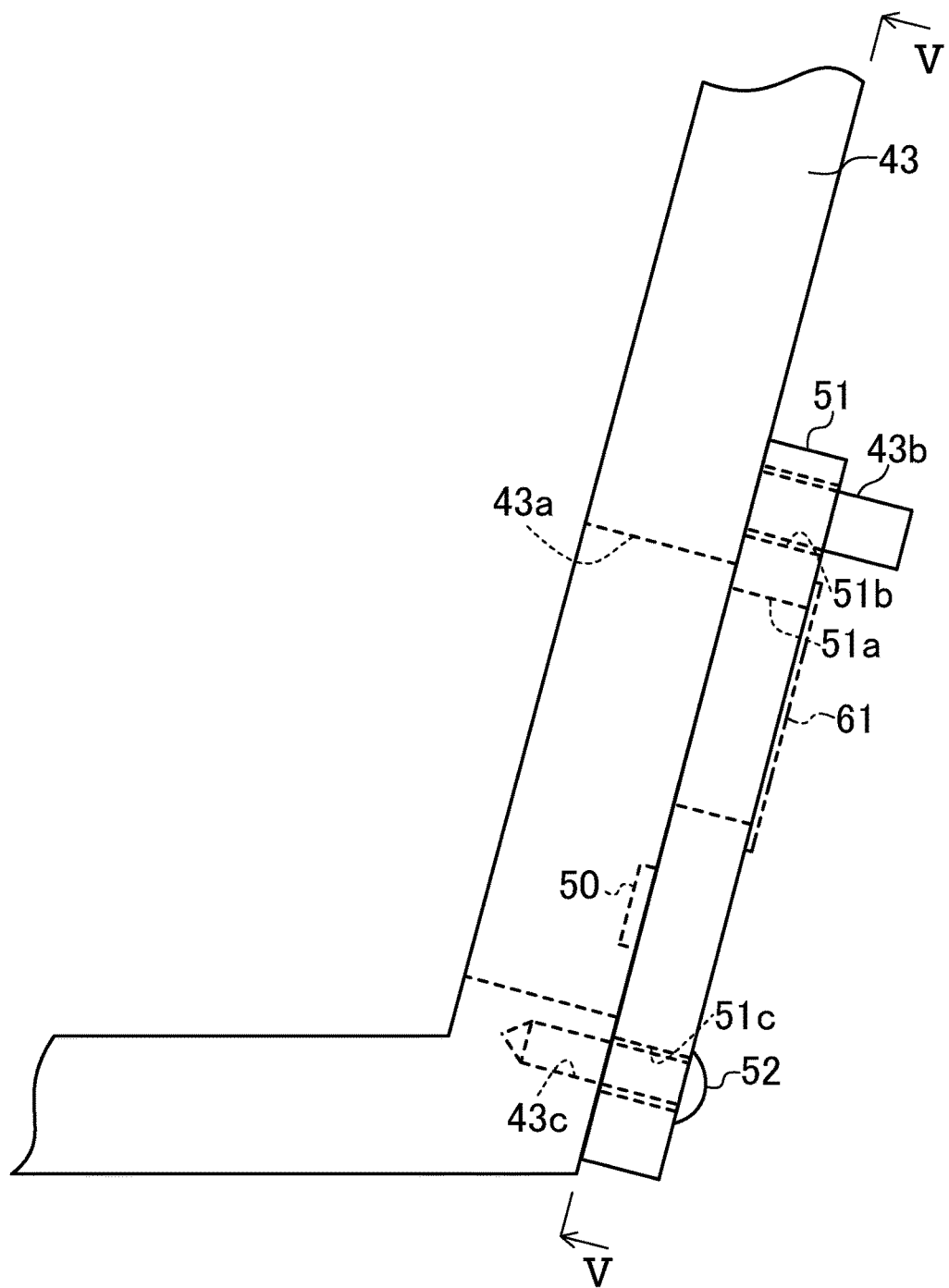
FIG. 3 is an enlarged view of a part III of FIG. 2.
Figure 4:
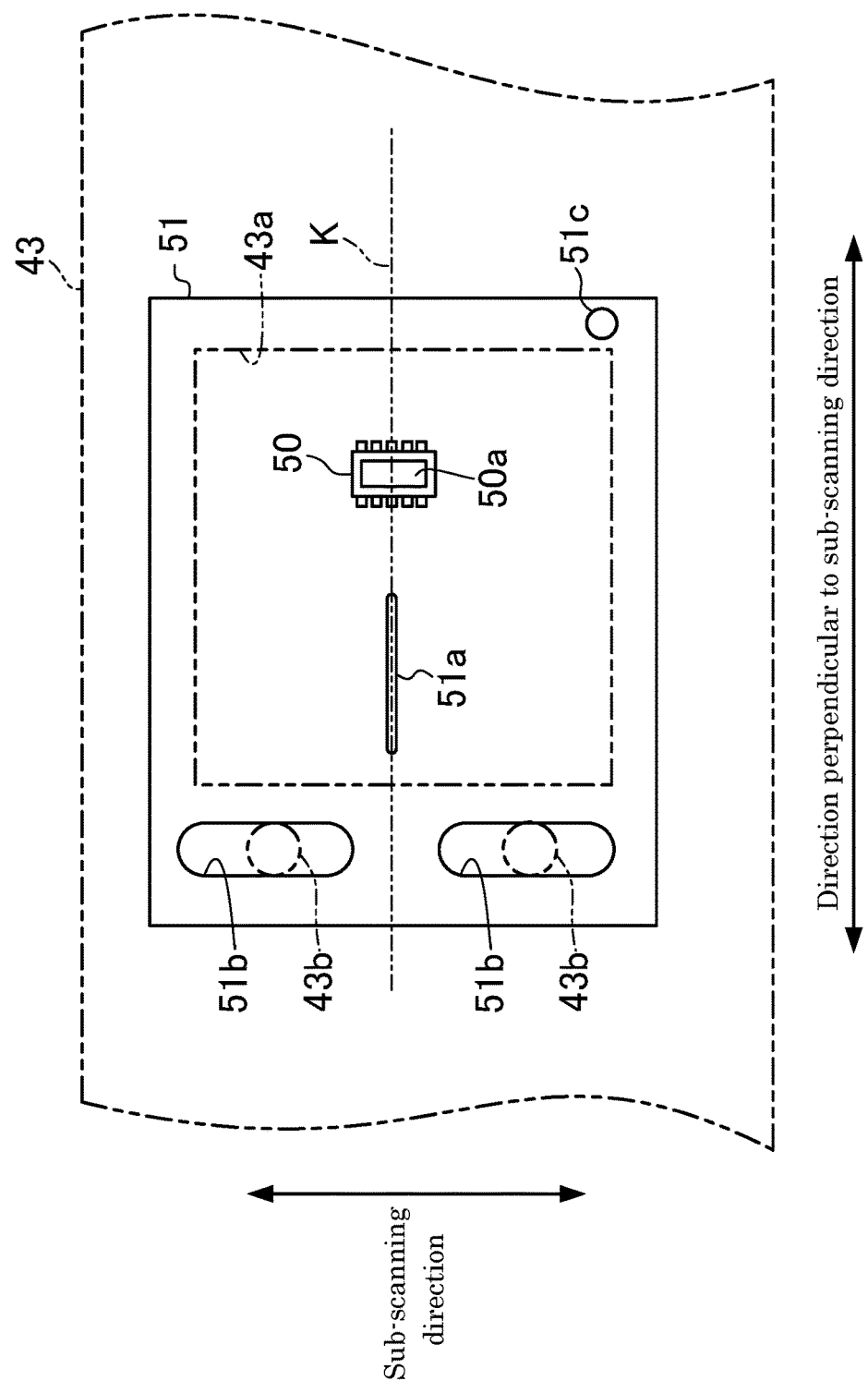
FIG. 4 is a view viewed in the arrow direction of IV of FIG. 2.

As illustrated in FIG. 3 and FIG. 4, the synchronization detection sensor 50 is mounted on the side wall part 43 of the housing 40 via the sensor board 51. The sensor board 51 is mounted on an outer surface of the side wall part 43 (an outer surface of the housing 40 in the side wall part 43). The housing 40 is formed at the side wall part 43 thereof with a rectangular opening 43a that allows the scanning light L from the aforementioned synchronization detection mirror 49 to pass therethrough. The synchronization detection sensor 50 mounted on the sensor board 51 is exposed inside the housing 40 from the opening 43a.

The synchronization detection sensor 50 is formed in a rectangular shape long in the sub-scanning direction (that is, a height direction of the side wall part 43) when viewed from an inner side of the housing 40 (see FIG. 4). Similarly, a light receiving surface 50a of the synchronization detection sensor 50 is also formed in a rectangular shape long in the sub-scanning direction. The length of the light receiving surface 50a in the sub-scanning direction is 3 mm in the present embodiment, and the length of the light receiving surface 50a in a direction perpendicular to the sub-scanning direction is 0.5 mm in the present embodiment.

The aforementioned sensor board 51 is formed in a rectangular plate shape having long sides and short sides.

The short sides of the sensor board 51 extend in parallel with long sides of the light receiving surface 50a of the synchronization detection sensor 50. The long sides of the sensor board 51 extend in parallel with short sides of the light receiving surface 50a.

The sensor board 51 is formed with a light transmitting hole 51a which allows a part of the scanning light L from the synchronization detection mirror 49 to pass therethrough when the scanning light L is incident into a center position of the light receiving surface 50a of the synchronization detection sensor 50 in the sub-scanning direction. The light transmitting hole 51a is formed at a lateral side of the synchronization detection sensor 50. The transmitting hole 51a is formed on an extension line K of a center line (a straight line passing through the center position of the light receiving surface 50a in the sub-scanning direction and extending in the direction perpendicular to the sub-scanning direction) of the light receiving surface 50a of the synchronization detection sensor 50 in the sub-scanning direction. The light transmitting hole 51a is formed in a slit hole shape extending in the direction perpendicular to the sub-scanning direction. The length of the light transmitting hole 51a in the sub-scanning direction is 0.1 mm to 0.2 mm in the present embodiment, and the length of the light transmitting hole 51a in the direction perpendicular to the sub-scanning direction is 5 mm to 10 mm in the present embodiment.

In the vicinity of one side of the sensor board 51 extending in the sub-scanning direction, a pair of guide holes 51b are formed in a row in the sub-scanning direction while being spaced apart from each other. Each guide hole 51b is formed in a long hole shape extending in the sub-scanning direction. A pair of projecting bosses 43b projecting from the side wall part 43 of the housing 40 are engaged with the guide holes 51b, respectively.

Figure 5:
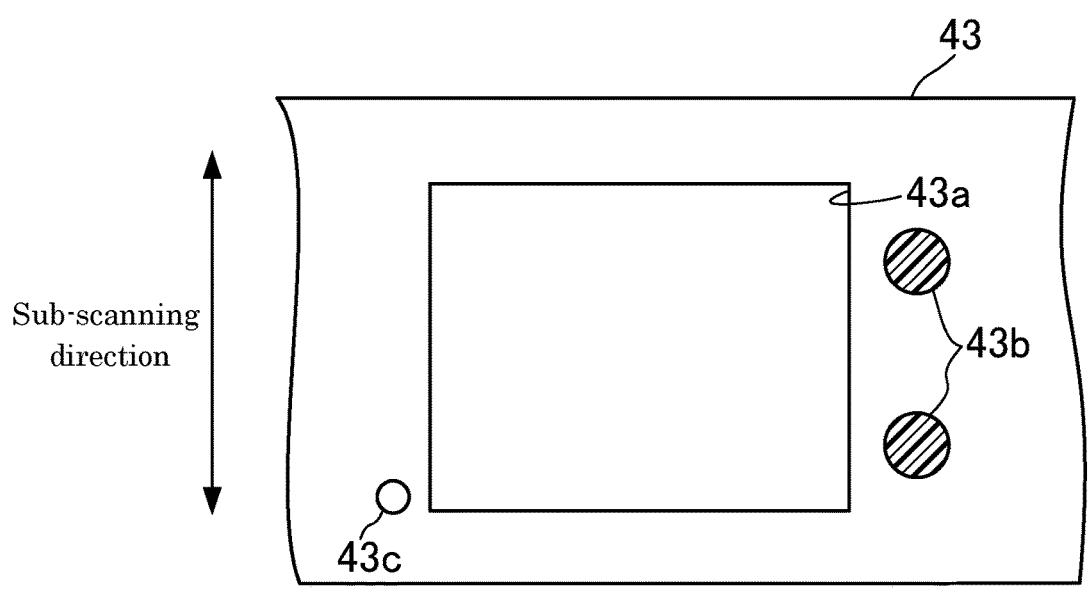
FIG. 5 is a sectional view taken along line V-V of FIG. 3.

The aforementioned pair of projecting bosses 43b are formed adjacent to one side portion of the aforementioned opening 43a extending in the sub-scanning direction (see FIG. 5). The pair of projecting bosses 43b are formed in the sub-scanning direction while being spaced apart from each other. Each projecting boss 43b is formed in a columnar shape in the present embodiment; however, the technology of the present disclosure is not limited thereto and for example, the projecting boss 43b may also have a prismatic shape. In the vicinity of the other side portion of the opening 43a extending in the sub-scanning direction, a screw hole 43c for fixing the sensor board 51 is formed. The sensor board 51 is fixed to the side wall part 43 by a mounting screw 52 (see FIG. 3) screwed into the screw hole 43c. A reference numeral 51c of FIG. 3 indicates a mounting hole formed in the sensor board 51 and allows the aforementioned mounting screw 52 to pass therethrough.

Figure 6A:
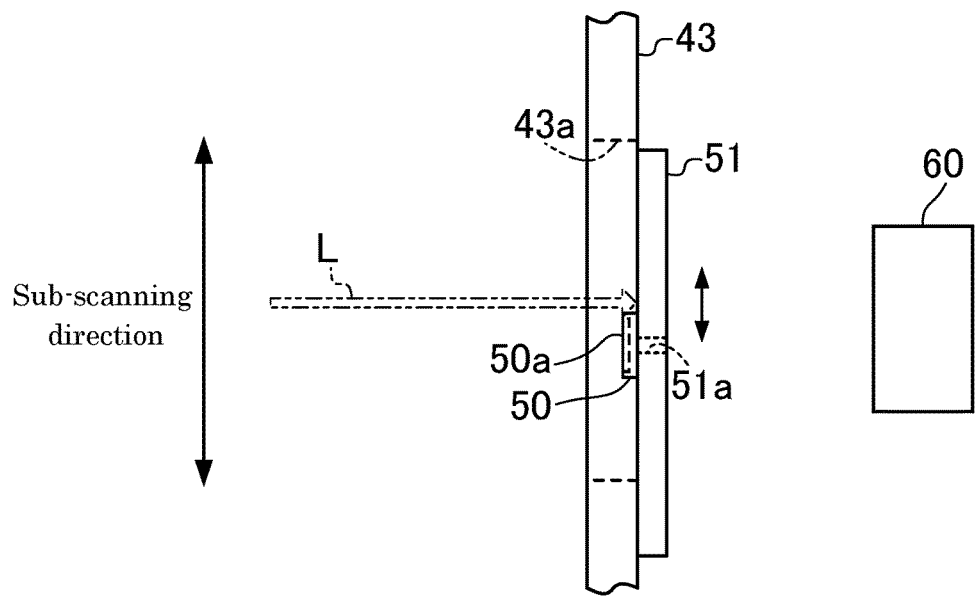
FIG. 6A is an explanation diagram for explaining a position adjustment method of a synchronization detection sensor in an example of an embodiment.
Figure 6B:
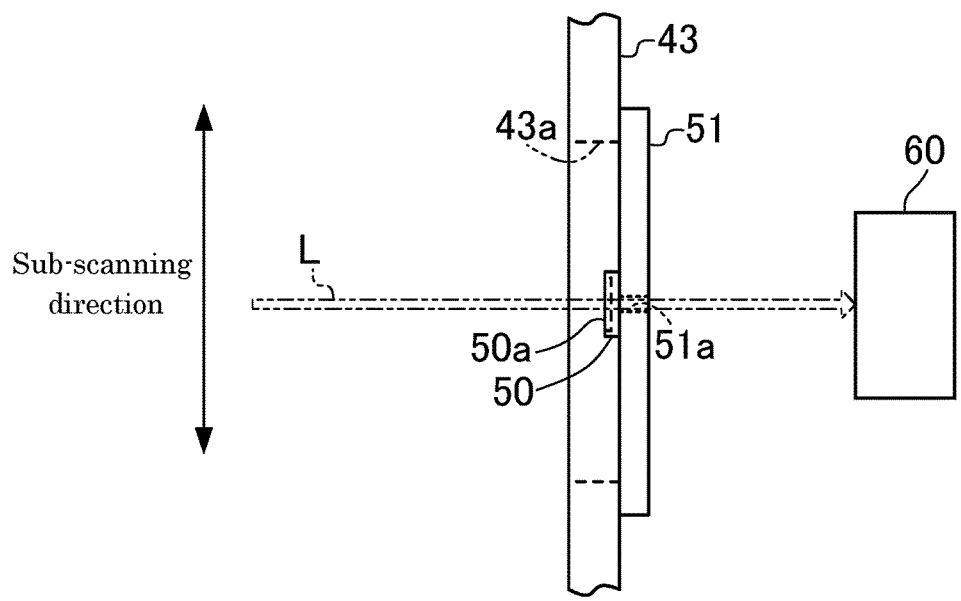
FIG. 6B is an explanation diagram for explaining a position adjustment method of a synchronization detection sensor in an example of an embodiment.

Next, with reference to FIG. 6A and FIG. 6B, a position adjustment method of the synchronization detection sensor 50 in the sub-scanning direction will be described. Firstly, an optical detection sensor 60 including a CCD sensor, a photo sensor and the like is arranged at a rear surface side of the sensor board 51. Next, the pair of guide holes 51b (not illustrated in FIG. 6A and FIG. 6B and see FIG. 3 and FIG. 4) formed in the sensor board 51 are allowed to be engaged with the aforementioned pair of projecting bosses 43b projecting from the outer surface of the housing 40. Then, in this state, the sensor board 51 are moved in the sub-scanning direction, resulting in a change in the position of the synchronization detection sensor 50 in the sub-scanning direction. Herein, as illustrated in FIG. 6A, when the position of the scanning light L from the synchronization detection mirror 49 in the sub-scanning direction is deviated from the center position of the light receiving surface 50a of the synchronization detection sensor 50 in the sub-scanning direction, since the scanning light L is blocked by the sensor board 51, the scanning light L is not detected by the optical detection sensor 60. On the other hand, as illustrated in FIG. 6B, when the position of the scanning light L from the synchronization detection mirror 49 in the sub-scanning direction coincides with the center position of the light receiving surface 50a of the synchronization detection sensor 50 in the sub-scanning direction, the scanning light L from the synchronization detection mirror 49 passes through the light transmitting hole 51a of the sensor board 51 and is detected by the optical detection sensor 60. Consequently, after the scanning light L is detected by the optical detection sensor 60, the movement of the sensor board 51 in the sub-scanning direction is stopped and the sensor board 51 is fixed by the mounting screw 52, so that it is possible to allow the position of the scanning light L incident into the light receiving surface 50a of the synchronization detection sensor 50 to coincide with the center position of the light receiving surface 50a in the sub-scanning direction. Thus, it is possible to reliably avoid a problem that the scanning light L from the synchronization detection mirror 49 is not incident into the light receiving surface 50a. Accordingly, it is possible to prevent synchronization detection failure of the optical scanning device 4.

Moreover, since the light transmitting hole 51a is formed in the sensor board 51 mounted with the synchronization detection sensor 50, it is not necessary to assemble a slit plate having the light transmitting hole 51a to a front side of the synchronization detection sensor 50 at the time of position adjustment of the synchronization detection sensor 50 as with the conventional art. Consequently, it is possible to prevent the reduction of position adjustment accuracy of the synchronization detection sensor 50 due to assembling errors of the slit plate.

Furthermore, in the aforementioned embodiment, since it is sufficient if the scanning light L having passed through the light transmitting hole 51a is not detected by the synchronization detection sensor 50 and is detected by the optical detection sensor 60 provided separately from the synchronization detection sensor 50, even when a wiring work of the synchronization detection sensor 50 has not been completed, it is possible to start the position adjustment work of the synchronization detection sensor 50. Consequently, it is possible to prevent breakage due to entanglement and the like of a wiring during the position adjustment work of the synchronization detection sensor 50.

Furthermore, in the aforementioned embodiment, the light transmitting hole 51a formed in the aforementioned sensor board 51 extends in a direction perpendicular to the aforementioned sub-scanning direction, that is, in a scanning direction of the scanning light L from the synchronization detection mirror 49.

Consequently, it is possible to sufficiently ensure a light amount of the scanning light L passing through the light transmitting hole 51a in the position adjustment of the synchronization detection sensor 50. Thus, it is possible to accurately and reliably perform the position adjustment of the synchronization detection sensor 50.

Furthermore, in the aforementioned embodiment, in the position adjustment of the synchronization detection sensor 50, it is possible to guide the movement of the sensor board 51 in the sub-scanning direction by the projecting bosses 43b engaged with the guide holes 51b of the sensor board 51. Thus, it is possible to more easily perform the position adjustment work of the synchronization detection sensor 50.

Furthermore, in the aforementioned embodiment, the sensor board 51 is mounted on the outer surface of the housing 40 in the side wall part 43 of the housing 40, and the side wall part 43 is formed with the opening 43a for leading the scanning light L from the polygon mirror 47, which has been reflected by the synchronization detection mirror 49, to the synchronization detection sensor 50.

According to this configuration, as compared with the case in which the sensor board 51 has been mounted on the inner surface of the housing in the side wall part 43, it is possible to sufficiently ensure a mounting space when the sensor board 51 is mounted on the side wall part 43. Thus, it is possible to easily perform the position adjustment work of the synchronization detection sensor 50. Furthermore, even when the sensor board 51 has been mounted on the outer side of the side wall part 43, it is possible to lead scanning light from the opening 43a to the synchronization detection sensor 50 and the light transmitting hole 51a.

Preferably, the aforementioned optical scanning device 4 includes a seal member 61 (see FIG. 3) for closing the light transmitting hole 51a, which has been formed in the aforementioned sensor board 51, after the position adjustment of the sensor board 51.

In this way, it is possible to prevent the scanning light L from being leaked to the outside of the housing 40 from the light transmitting hole 51a of the sensor board 51 at the time of image formation. Accordingly, it is possible to prevent the leaked scanning light L from being reflected by other parts and being incident into the photosensitive drums 11.

In the aforementioned embodiment, the light receiving surface 50a of the synchronization detection sensor 50 is formed in a rectangular shape long in the sub-scanning direction.

According to this, even when the position of the scanning light L in the sub-scanning direction, which is incident into the synchronization detection sensor 50, has been slightly deviated due to thermal deformation of the polygon mirror 47, assembling errors of the synchronization detection mirror 49, and the like, it is possible to allow the scanning light L to be reliably incident into the light receiving surface 50a of the synchronization detection sensor 50. Thus, it is possible to reliably prevent synchronization detection failure which occurs when the scanning light L is not incident into the light receiving surface 50a.

Since the image forming apparatus 1 of the aforementioned embodiment includes the above-described optical scanning devices 4, it is possible to reliably prevent synchronization detection failure and thus to reliably prevent image failure such as a color shift from occurring in an image printed on the paper P.

OTHER EMBODIMENTS

In the aforementioned embodiment, the scanning light L from the polygon mirror 47 is led to the synchronization detection sensor 50 by the synchronization detection mirror 49; however, the technology of the present disclosure is not limited thereto and for example, the synchronization detection mirror 49 may be abolished and the scanning light L from the polygon mirror 47 may also be directly led to the synchronization detection sensor 50.

In the aforementioned embodiment, the sensor board 51 is mounted on the outer surface of the side wall part 43 of the housing 40; however, the technology of the present disclosure is not limited thereto. That is, the sensor board 51 may also be mounted on the inner surface of the side wall part 43 of the housing 40.

In the aforementioned embodiment, the example in which the image forming apparatus 1 is a color printer has been described. However, the technology of the present disclosure is not limited thereto, and the image forming apparatus 1, for example, may also be a copy machine, a multifunctional peripheral (MFP) and the like.

As described above, the present invention is useful for an optical scanning device, an image forming apparatus including the optical scanning device, and a position adjustment method of a synchronization detection sensor mounted in the optical scanning device.

What is claimed is:

1. An optical scanning device comprising:
a light source that emits light;
a deflector that deflects the light emitted from the light source and allows the deflected light to be scanned in a main scanning direction;
a housing that accommodates the deflector;
a synchronization detection sensor mounted in the housing, detecting scanning light from the deflector, and outputting a write timing reference signal of image data; and
a sensor board mounted with the synchronization detection sensor,
wherein the sensor board is formed with a light transmitting hole for allowing a part of the scanning light to pass therethrough when an incident position of the scanning light for a light receiving surface coincides with a center position of the light receiving surface in a sub-scanning direction on an extension line of a center line of the light receiving surface of the synchronization detection sensor in the sub-scanning direction.

2. The optical scanning device of claim 1, wherein the light transmitting hole formed in the sensor board extends in a direction perpendicular to the sub-scanning direction.

3. The optical scanning device of claim 1, wherein the housing has a bottom wall part mounted with the deflector and a side wall part upright along the sub-scanning direction from a peripheral edge portion of the bottom wall part and mounted with the sensor board,
the sensor board has a pair of guide holes arranged in the sub-scanning direction while being spaced apart from each other and extending in the sub-scanning direction, and
the side wall part of the housing is provided with projecting bosses respectively engaged with the pair of guide holes and guiding the sensor board so as to be movable in the sub-scanning direction.

4. The optical scanning device of claim 1, wherein the sensor board is mounted at an outer surface of the housing in the side wall part of the housing, and
the side wall part of the housing is formed with an opening that leads scanning light for synchronization detection to the synchronization detection sensor.

5. The optical scanning device of claim 1, further comprising:
a seal member for closing the light transmitting hole formed in the sensor board after position adjustment of the sensor board.

6. The optical scanning device of claim 1, wherein the light receiving surface of the synchronization detection sensor has a shape long in the sub-scanning direction.

7. A position adjustment method of a synchronization detection sensor in the optical scanning device of claim 1, comprising the steps of:

arranging an optical detection sensor at a side opposite to a side at which the synchronization detection sensor is mounted on the sensor board;

moving the sensor board in the sub-scanning direction; and stopping movement of the sensor board and fixing the sensor board after a part of the scanning light directed to the synchronization detection sensor passes through the light transmitting hole formed in the sensor board and is detected by the optical detection sensor, thereby adjusting a position of the synchronization detection sensor in the sub-scanning direction.

8. An image forming apparatus comprising the optical scanning device of claim 1.

\* \* \* \* \*